Figure 1:
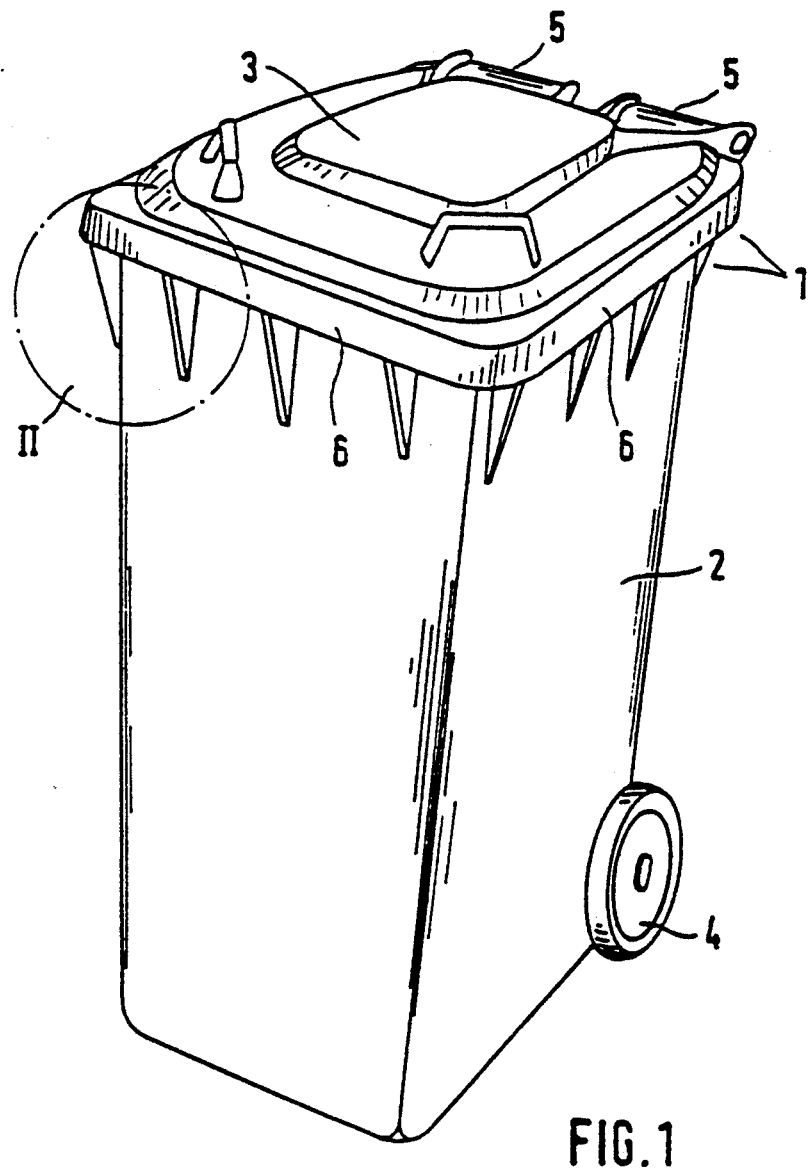

United States Patent [19]

Schäfer

[11] Patent Number: 5,326,939
[45] Date of Patent: Jul. 5, 1994

[54] IDENTIFICATION UNIT FOR GARBAGE CANS

[75] Inventor: Gerhard Schäfer, Neunkirchen-Salchendorf, Fed. Rep. of Germany

[73] Assignee: Fritz Schafer Gesellschaft mit beschränkter Haftung, Neunkirchen, Fed. Rep. of Germany

[21] Appl. No.: 847,043

[22] PCT Filed: Aug. 1, 1991

[86] PCT No.: PCT/EP91/01445
§ 371 Date: Apr. 14, 1992
§ 102(e) Date: Apr. 14, 1992

[87] PCT Pub. No.: WO92/03361
PCT Pub. Date: Mar. 5, 1992

[30] Foreign Application Priority Data

Aug. 14, 1990 [DE] Fed. Rep. of Germany ....... 9011787

[51] Int. Cl.⁵ .................... G01G 19/08; G01G 13/14
[52] U.S. Cl. .................................. 177/139; 177/25.19
[58] Field of Search ........................... 177/139, 25.19

[56] References Cited

U.S. PATENT DOCUMENTS

| 4,645,018 | 2/1987 | Garbade et al. | 177/139 |
| 5,004,392 | 4/1991 | Naab | 177/139 X |
| 5,015,142 | 5/1991 | Carson | 414/411 X |

FOREIGN PATENT DOCUMENTS 8612623  8/1986  Fed. Rep. of Germany.

*Primary Examiner*—George H. Miller, Jr.
*Attorney, Agent, or Firm*—Anderson Kill Olick & Oshinsky

[57] ABSTRACT

The proposal is for an identification unit for rubbish containers (1) which can be emptied by emptying devices or by tipping into dustcarts and can be weighted to determine the weight of the rubbish in them before and after emptying on the emptying device or tipping. The rubbish container (1) has a recognition sensor (7) which can be brought into correspondence with an identification system on board the individual dustcart and associated with the emptying device or tipping out procedure. To give the identification device long-term reliability, the recognition sensor (7) is inserted and/or enclosed on all sides in a recess (8) of the stiffening lip or tipping grip (6) on the rubbish container (2).

6 Claims, 5 Drawing Sheets

IDENTIFICATION UNIT FOR GARBAGE CANS

The invention deals with an identification unit for garbage cans, which can be emptied by means of emptying devices or so-called dumping or tipping into collection vehicles as well as being weighable for determination of the weight of the garbage contained therein respectively before and after the emptying process upon the emptying device or dumping arrangement, wherein the garbage can carries a coded sensor, which can be put into communication with an identification system assigned to the emptying device or the dump on board the collection vehicle.

Methods and devices for determining the weight of garbage, especially household- and industrial garbage have already been proposed for garbage disposal, which not only enable an accurate weight-wise determination of the garbage contained in the respective garbage can but which also permit to assign the garbage quantities concerned to the respective originator and then to assure garbage disposal fee calculation referred to weight.

While namely flat garbage disposal fees do not encourage citizens and plants to reduce the amounts of garbage, a calculation of the garbage disposal fee as a function of weight can have a salutary effect upon the reduction of the generated volumes of garbage.

In particular this method encourages the originator to perform a classification of the generated garbage in such a way, that a separate collection of biological garbage, recycleable garbage and garbage to be dumped on a waste stockpile is performed. If then the fee calculation for the different types of garbage are based on appropriately different fee units, then the actual garbage disposal can be optimized through the garbage disposal fee generated.

A precondition for the smooth handling of garbage disposal in this case is however, that each individual garbage can be equipped with an identification unit, which not only assures a correct assignment to the respective originator, rather in addition also assures that only those garbage cans are always emptied into the collection vehicle, which also comprise the code for the respective type of garbage.

In any case it is of decisive importance, that the identification unit on the garbage can contain an instruction which not only assures smooth communication with the identification system on board of the collection vehicle, rather is also simultaneously rugged in continuous use.

The invention achieves this target definition mainly in that the code sensor is housed in a receptacle of the stiffening collar or dumping engagement grip or part at the garbage can and/or is enclosed on all sides.

The stiffening collar or the dumping engagement grip is an element of the garbage cans necessary for their functioning, because they come into interaction with the emptying devices on board of or dumping arrangements in the collection vehicle. For this purpose stiffening collars or dumping engagement parts or grips are laid out in a rugged and dimensionally stable manner and can therefore be utilized as a permanently secure housing for the code sensor.

Herein it has proved itself, if in the invention the coding sensor is housed in the receptacle so as to be protected from shocks, for instance cushioned or floating or suspended with spacing on all sides from the enclosing walls.

It has also proved itself if the receptacle consists of a pot- or tub-shaped depression molded into the stiffening collar or the dumping engagement part, which is closable by a lid. The receptacle can be molded in this manner simply indeed within or in between the ribbing of the stiffening collar or dumping engagement part in the injection molding die of the garbage can.

The lid serving for closure of the receptacle after insertion of the coding sensor can be fixed at the stiffening collar or the dumping engagement part by welding, bonding, bolting or riveting; and this independently of the circumstance whether the opening of the pot- or tub-shaped molding and with this the lid covering same is located at the bottom side, the top side or at the peripheral side of the stiffening collar or dumping engagement part.

It is entirely possible in the invention to fix the coding sensor and/or the lid closing off its receptacle by means of a snap-in-, detent- or clip type device at the stiffening collar or the dumping engagement part or grip of the garbage can.

The coding sensor can however in the invention be rigidly molded as an inserted part into the stiffening collar or dumping engagement part of the garbage can fabricated as an injection molded part from plastics material.

Finally it is also within the framework of the invention to provide the coding sensor and/or the lid with threads, by means of which it can be screwed into a counter thread or matching thread in the stiffening collar or dumping engagement part.

In every installation- or location-case of the coding sensor it is essential, that it be fixed in the receptacle at the stiffening collar or the dumping engagement part so as to be protected against unauthorized outside interference, so that it can only be removed by destruction of itself, its receptacle and/or the lid closing off same.

The drawings are intended to explain embodiment examples of the subject of the invention. It is shown on:

FIG. 1—a three-dimensional front view of a garbage can laid out for cooperation with an on board emptying device or dumping arrangement in a collection vehicle, FIG. 2—the cutout region from a garbage can designated by II in FIG. 1 in actual size with the identification arrangement assigned in the invention, FIG. 3—the installation layout of the identification unit shown in FIG. 2 in direction of the arrow III, thus viewed from below, FIG. 4—an illustration corresponding to FIG. 2 with an identification unit installed in accordance with a different version, FIG. 5—the cutout region from a garbage can in FIG. 4 viewed in direction of the arrow V, thus from the top, FIG. 6—once more the region cut out from a garbage container designated by II in the drawing in FIG. 1 where the identification unit is again housed in a different manner, FIG. 7—the arrangement in FIG. 6 partially in section and partially in front view corresponding to the line VII—VII, while the FIGS. 8 to 11 show in section various other housing possibilities of the coding sensor serving as identification unit in the stiffening collar or the dumping engagement grip of the garbage can.

FIG. 1 of the drawing shows a garbage can 1 in the shape of a so-called bulk garbage bucket, where the garbage container 2 proper can be closed at the top by a hinged flat lid 3. The garbage can 2 is equipped at its bottom with two wheels for traveling supported in the vicinity of its rear edge, of which however only one is visible.

Two handles 5 are integrated into the hinged connection between the folding lid 3 and the garbage container 2, which provide the possibility to move the entire garbage can 1 on the traveling wheels 4 in a simple manner should this be required.

An important refinement of the garbage can 1 is seen in that a stiffening collar or dumping engagement part or grip 6 is provided at the upper end of its garbage container. This stiffening collar or dumping engagement grip 6 serves herein in the first instance towards the cooperation of the garbage cans with the emptying device or dumping arrangement of a garbage collection vehicle, which as a rule acts or is designed as a so-called lifting- and tipping-device.

The emptying device or dumping arrangement of the garbage collection vehicle grips namely the garbage can 1 at its stiffening collar or dumping engagement part 6 of its garbage container 2 in order to enable the lifting, tilting or damping and lowering constituting the emptying cycle.

The following requirement arises with increasing frequency: the necessity of determining consecutively during the emptying cycle of the garbage can 1 into the collection vehicle a gross- and tare weight, in order to therein determine the respective net weight of the garbage accumulated in the garbage can 1 involved. Instead of the hitherto usual flat garbage disposal fees, garbage disposal fees relating to weight are to be invoiced in the future, in order to hereby encourage the origination of a reduced accumulated garbage quantity.

In order to perform the calculation of such garbage disposal fees depending on weight there exists the necessary, on the one hand, not only to equip the collection vehicle with a weighing system for the waste collection, rather in addition to this to provide an identification system for the garbage cans. The precondition for the operability of the identification system herein is that each individual garbage can be equipped with an identification unit, which makes possible the activation of the weighing system in the collection vehicle for the waste collection only by means of the identification system in the collection vehicle and at the same time put into operation the emptying device or dumping arrangement equipped with this weighing system.

Herein the identification unit must be assigned to the garbage can in such a way, that, given the routine handling of said garbage container, it can enter into communication with the identification system in the collection vehicle without any difficulties. It must however be provided also in such a way, that it cannot easily be removed or separated from the garbage can. Finally the identification system must however also be provided in such a way, that it remains insensitive against the stresses occurring in continuous operation and does not easily permit a change in its coding.

It is evident from FIGS. 2 to 7 of the drawing, that the identification unit comprises a coding sensor 7 for each individual garbage can 1, which is housed in a receptacle in the stiffening collar or dumping engagement part 6 at the garbage container 2 proper. Herein it is important, that the coding sensor must be housed in the receptacle 8 so as to be protected from shock, for instance cushioned or spaced on all sides from the enclosing walls of the receptacle 8 and that it is enclosed on all sides in said receptacle.

The receptacle 8 can consist of a pot- or tub-shaped molding, which is located in the stiffening collar or the dumping engagement grip 6 between the stiffening ribs 9, which serves for the appropriate stabilization of the stiffening collar or dumping engagement grip 6.

After the coding sensor 7 has been placed into the receptacle 8, said receptacle can be closed by placing a lid 10 thereon. Herein the lid can be fixed at the stiffening collar or dumping engagement grip 6 in such a way by welding, bonding, bolting or riveting, that a removal or a replacement of the coding sensor 7 can be performed only by damaging the lid 10 or the stiffening collar or dumping engagement grip 6.

Figure 2:
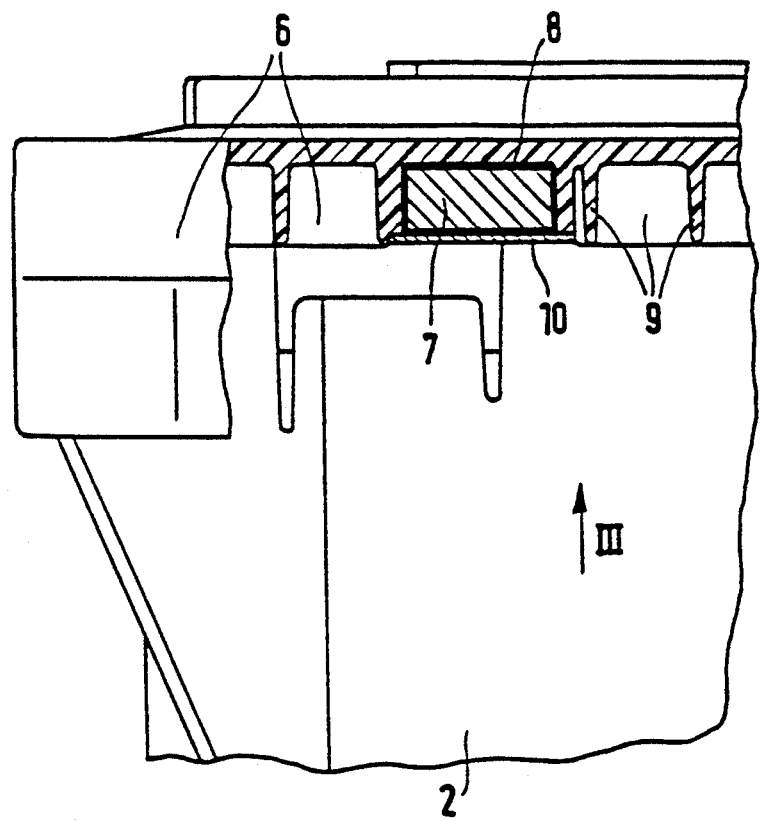
Figure 3:
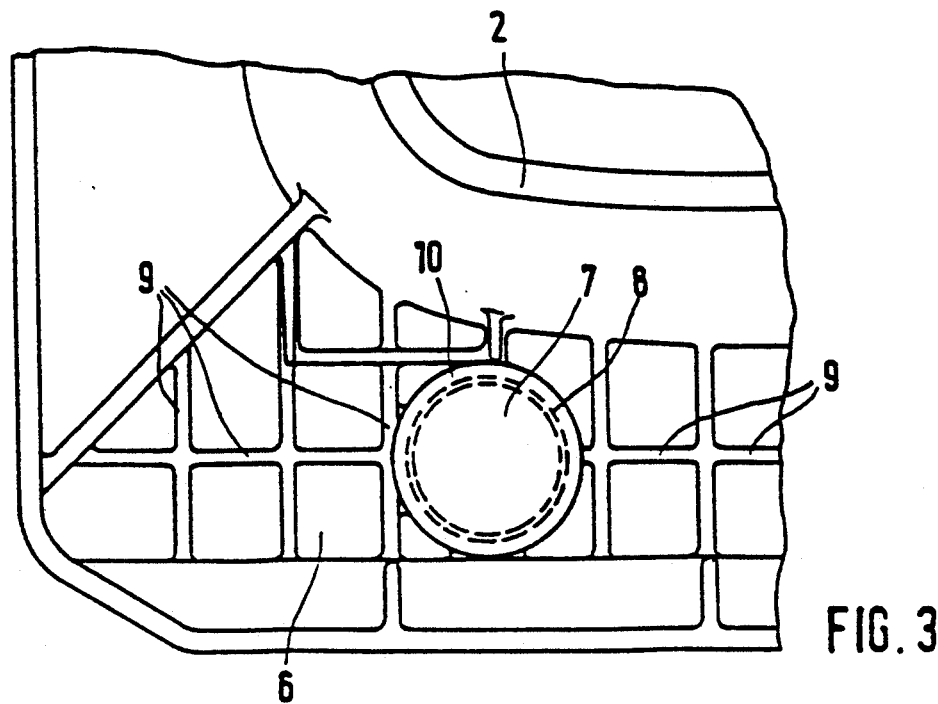

FIGS. 2 and 3 of the drawing show a design of the stiffening collar or the dumping engagement grip 6, where the receptacle 8 is formed by a pot- or tub-shaped molding, with its opening being located at the bottom side of the stiffening collar or the dumping engagement grip 6, thus having to be closed by a lid placed on it from below. Herein the lid 10 is rigidly connected around its periphery with the opening edge of the receptacle 8 by bonding and/or welding.

Figure 4:
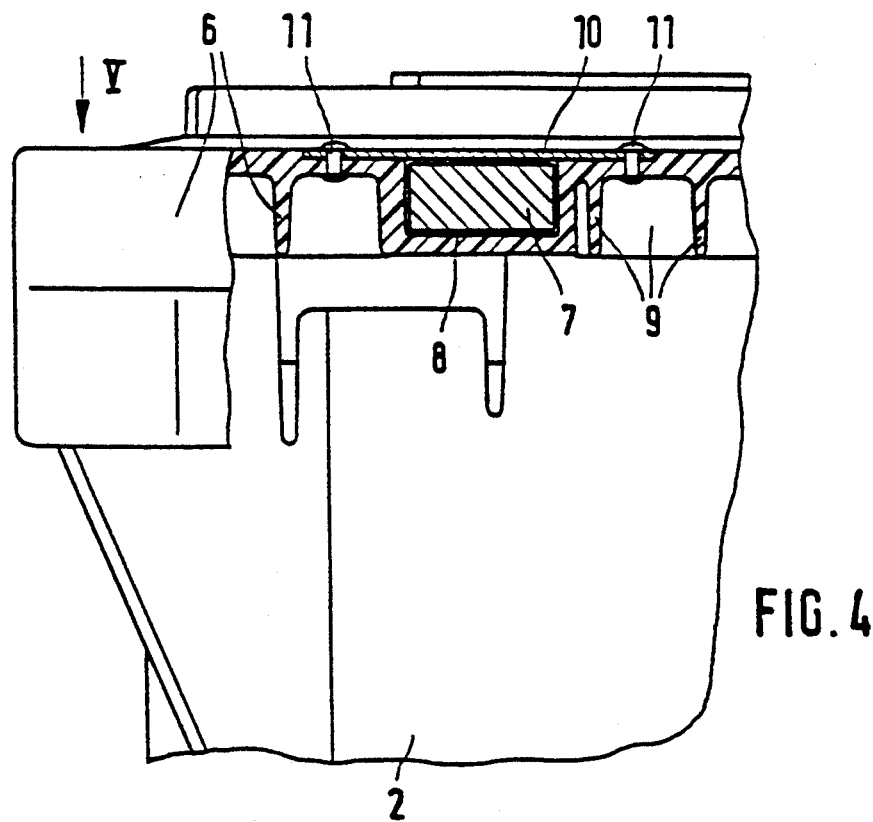
Figure 5:
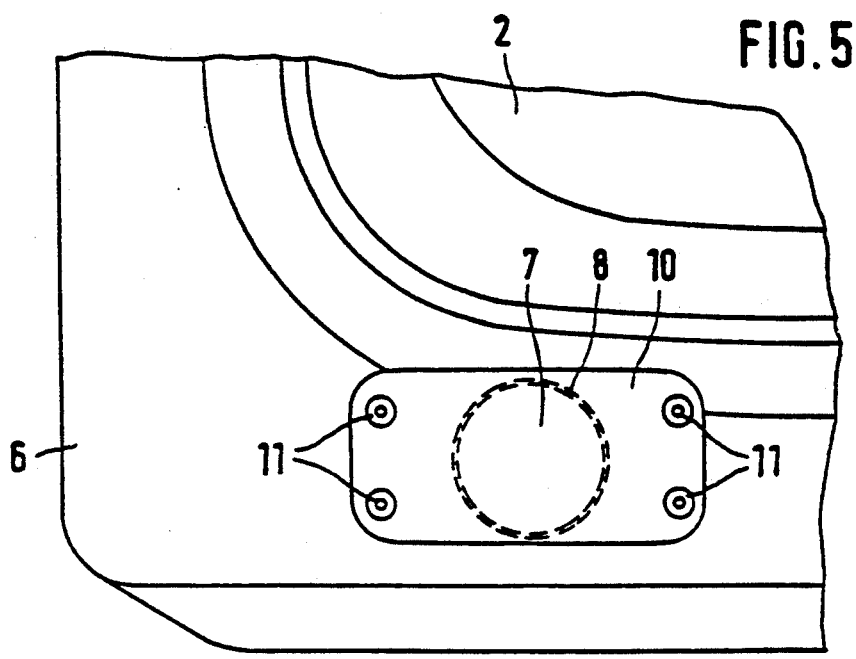

In the embodiment example in FIGS. 4 and 5 a pot- or tub-shaped molding 8 serving as a receptacle 8 for the coding sensor 7 is molded with an upwardly directed aperture into the stiffening collar or dumping engagement grip 6 of the garbage container 2. Therefore it is closed by a lid 10 placed upon it from the top. In this case the lid 10 is rigidly connected with the stiffening collar or the dumping engagement part 6 by riveting 11.

Figure 6:
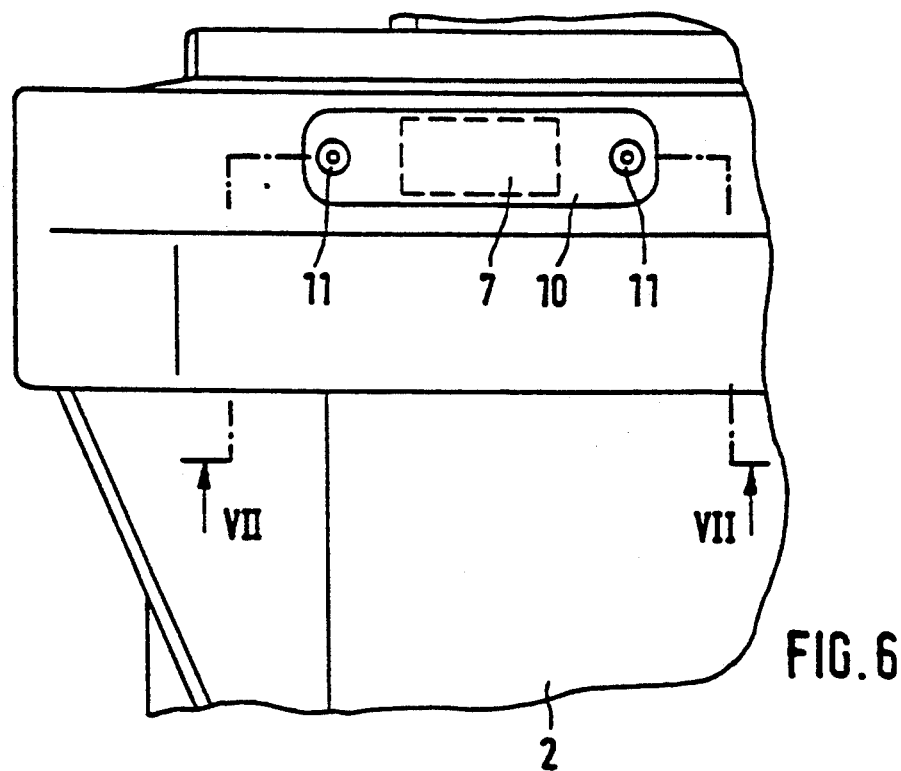
Figure 7:
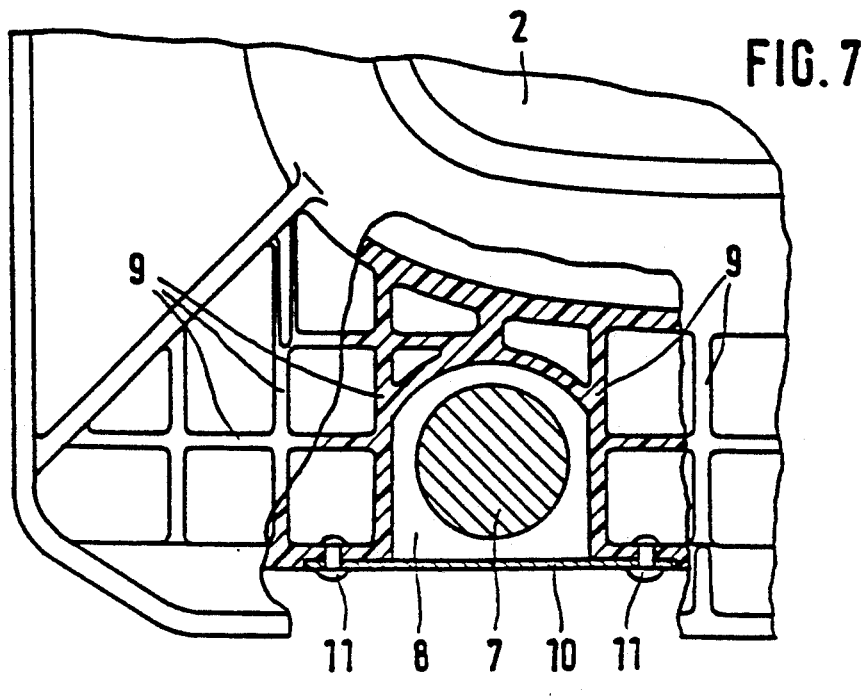

Finally an embodiment example can be seen in FIGS. 6 and 7 of the drawing, where the receptacle for the coding sensor 7 is configured in the stiffening collar or dumping engagement grip 6 so as to be open towards the side. The lid 10 in this case is thus placed from the side on this peripheral surface of the stiffening collar or dumping engagement part 6, in order to close the receptacle after the coding sensor has been inserted. Here also riveting 11 is provided for attachment of the lid 10.

It can additionally be seen in FIG. 7 of the drawing, that the coding sensor 7 can be inserted in such a way into the receptacle 8, so as to have spacing on all sides from the wall, preferably so that it can be retained therein cushioned, for instance by foam material linings or also floating or supported by spring elements. In this way an optimum protection against shock is assured for the coding sensor 7, although the stiffening rib 9 of the stiffening collar or dumping engagement grip 6 already is able to provide an optimum protection against damage.

The location of the coding sensor within the stiffening collar or the dumping engagement grip 6 at the garbage container 2 of the garbage can 1 has the advantage, that it can enter into communication with an interrogation receiver of the identification system aboard the vehicle, which is installed directly upon the grapple of the emptying device or dumping device, which cooperates with the stiffening collar or the dumping engagement grip.

Figure 8:
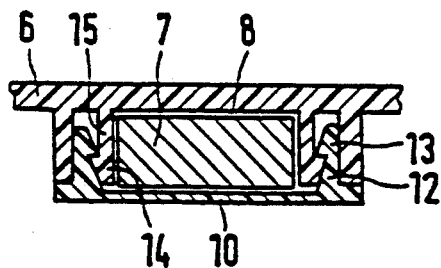

FIG. 8 of the drawing shows that the receptacle 8 for the coding sensor 7 in the stiffening collar or dumping engagement grip 6 of the garbage container 2 can also be secured in a different manner: namely, by using a lid 10, having a molded-on neck with an undercut hooked edge 13 extending in an annularly-shaped manner. This hooked edge 13 of the lid 10 is herein in operational connection with a complementary or matching hooked edge 14 at a collar 15 which encloses the receptacle 8 of this coding sensor 7 in an annularly-shaped manner. The hooked edges 13 and 14 herein act together as snap-in-, detent-, or clinking devices, which can only be detached from the lid 10, its neck 12 or the collar 15 by destoying same.

Figure 9:
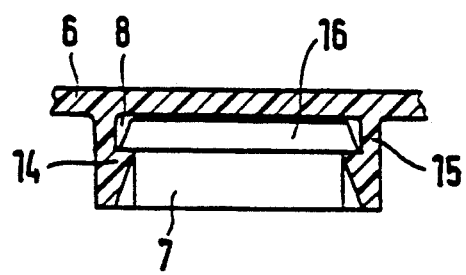

FIG. 9 of the drawing makes clear, that the coding sensor 7 itself can also be provided with an undercut shoulder 16, which coacts with the undercut edge 17 of the collar 15 with formation of a snap-in-, detent- or clinking arrangement. In this case the coding sensor 7 can also only be removed by destroying or damaging the collar 15 and/or its undercut edge 14. If the garbage container 2 is conventionally fabricated as a plastics material injection molded part, the possibility naturally exists to mold the coding sensor 7 solidly as an insertion part into the stiffening collar or dumping engagement grip 6, which is clearly shown in FIG. 10 of the drawing.

Figure 11:
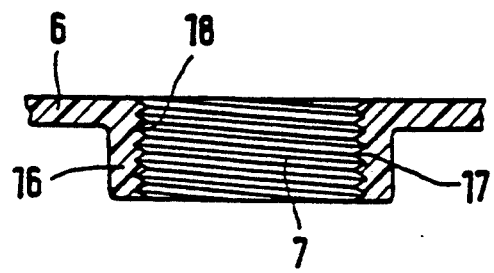

It is indicated in FIG. 11 that the stiffening collar or the dumping engagement grip 6 of a garbage container 2 may also comprise a socket 16 with internal thread 17 in which the coding sensor 7 can be anchored by a matching external thread 18. However, it would also be conceivable to screw the coding sensor 7 similarly to FIG. 11 into a receptacle 8 open only on one side by coaction of thread 17 and matching or counter thread 18 and additionally provide a lid 10 which then can be also attached by means of thread and matching thread.

Figure 10:
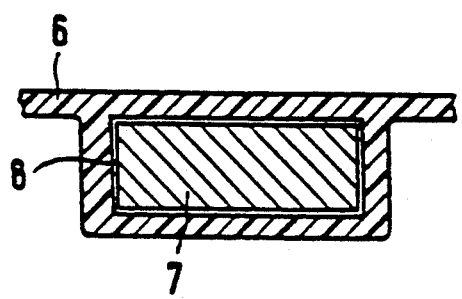

Naturally it is also possible in FIGS. 8, 9 and 10, to interconnect the cooperating functional parts by bonding or welding.

I claim:

1. An identification unit for a garbage can, which can be emptied by one of an emptying device and a dumping arrangement into collecting vehicles having an on-board identification system associated with the emptying device and the dumping arrangement, respectively, and which can be weighed on one of the emptying device and the dumping arrangement, respectively, for determining a weight of garbage contained therein before and after emptying;
wherein the identification unit comprises a coding sensor adapted to cooperate with the on-board identification system; and wherein the garbage can has a stiffening collar and a dumping engagement grip; and further wherein the coding sensor comprises threads cooperating with a matching thread in one of the stiffening collar and the dumping engagement grip.

2. An identification unit for a garbage can, which can be emptied by one of an emptying device and a dumping arrangement into collecting vehicles having an on-board identification system associated with the emptying device and the dumping arrangement, respectively, and which can be weighed on the emptying device and the dumping arrangement, respectively, for determining a weight of garbage contained therein before and after emptying;
wherein the identification unit comprises a coding sensor adapted to cooperate with the on-board identification system; and wherein the garbage can has a stiffening collar and a dumping engagement grip;
and further wherein one of the stiffening collar and the dumping engagement grip has a receptacle for receiving the coding sensor and a lid for closing the receptacle; and wherein the lid comprises threads cooperating with a matching thread in the one of the stiffening collar and the damping engagement grip.

3. An identification unit for a garbage can, which can be emptied by one of an emptying device and a dumping arrangement into collecting vehicles having an on-board identification system associated with the emptying device and the dumping arrangement, respectively, and which can be weighed on the emptying device and the dumping arrangement, respectively, for determining a weight of garbage contained therein before and after emptying;
wherein the identification unit comprises a coding sensor adapted to cooperate with the on-board identification system; and further wherein the garbage can has a stiffening collar having a plurality of stiffening ribs for stabilizing the same and a receptacle, which is located between the stiffening ribs, for receiving the coding sensor.

4. The identification unit of claim 3, wherein the receptacle is formed as a pot-shaped molding having an aperture stiffening collar further includes a lid for closing the aperture.

5. The identification unit of claim 3, further comprising one of welding means, a bonding means, a riveting means, a thread means, and a snap-in means for attaching the lid to the stiffening collar.

6. The identification system of claim 3, wherein the aperture is located at one of a top side, a bottom side, and a peripheral side of the pot-shaped molding.

* * * * *